United States Patent [19]

Yule

[11] 4,132,894

[45] Jan. 2, 1979

[54] MONITOR OF THE CONCENTRATION OF PARTICLES OF DENSE RADIOACTIVE MATERIALS IN A STREAM OF AIR

[75] Inventor: Thomas J. Yule, West Chicago, Ill.

[73] Assignee: The United States of America as represented by the United States Department of Energy, Washington, D.C.

[21] Appl. No.: 893,234

[22] Filed: Apr. 4, 1978

[51] Int. Cl.² .................. G01T 1/16; G01N 15/06
[52] U.S. Cl. ................................. 250/435; 73/28
[58] Field of Search ............. 73/28, 421.5 R, 432 PS; 250/435; 55/270

[56] References Cited

U.S. PATENT DOCUMENTS

| | | | |
|---|---|---|---|
| 2,879,664 | 3/1959 | Tait | 73/28 |
| 3,555,278 | 1/1971 | Schroeder | 250/435 |
| 3,795,135 | 3/1974 | Andersen | 73/28 |

OTHER PUBLICATIONS

Soole; "The Casella Mk. 2 Cascade Impactor: A Comparison of Observed With Calculated Stage Mass Median Diameters", *Aerosol Science*, vol. 2, No. 3, pp. 281-288, 1971.

*Primary Examiner*—Stephen A. Kreitman
*Attorney, Agent, or Firm*—Dean E. Carlson; Frank H. Jackson; Donald P. Reynolds

[57] ABSTRACT

A monitor of the concentration of particles of radioactive materials such as plutonium oxide in diameters as small as ½ micron includes in combination a first stage comprising a plurality of virtual impactors, a second stage comprising a further plurality of virtual impactors, a collector for concentrating particulate material, a radiation detector disposed near the collector to respond to radiation from collected material and means for moving a stream of air, possibly containing particulate contaminants, through the apparatus.

4 Claims, 4 Drawing Figures

TO MEASURING MEANS

MONITOR OF THE CONCENTRATION OF PARTICLES OF DENSE RADIOACTIVE MATERIALS IN A STREAM OF AIR

CONTRACTUAL ORIGIN OF THE INVENTION

The invention described herein was made in the course of, or under, a contract with the U.S. Department of Energy.

BACKGROUND OF THE INVENTION

This invention relates to the detection of small particles of radioactive materials such as plutonium oxide in the air. More particularly, this invention relates to an apparatus for concentrating particles of radioactive materials such as chemical combinations of selected isotopes of uranium, plutonium, americium and the like from a stream of air containing various of the radioactive isotopes described and also containig radioactive dust that emits alpha particles in a range that will comprise background noise in an instrument reading the alpha activity of the particles described above.

Certain isotopes of uranium and some of the transuranic elements emit radiation that must be monitored in the event of any escape of gases containing these elements. The maximum permissible concentrations of some of the transuranic isotopes over a 40-hour week are listed in Handbook 69 of the National Bureau of Standards. Certain information from that handbook is presented in Table I which lists for various isotopes the energy of alpha particles emitted, the half-lives and the maximum permissible concentrations.

TABLE I
IMPORTANT TRANSURANIC ISOTOPES WHICH EMIT ALPHA PARTICLES

| Isotope | Alpha Particle Energy (Mev) | Half-Life (Years) | MPC*a ($\mu$C/CC) |
|---|---|---|---|
| 236 Pu | 5.77 5.72 | 2.85 | $2 \times 10^{-12}$ |
| 238 Pu | 5.50 5.46 | 86.4 | $2 \times 10^{-12}$ |
| 239 Pu | 5.16 5.11 | 24,390 | $2 \times 10^{-12}$ |
| 240 Pu | 5.17 5.12 | 6580 | $2 \times 10^{-12}$ |
| 242 Pu | 4.90 4.86 | $3.79 \times 10^5$ | $2 \times 10^{-12}$ |
| 241 Am | 5.49 5.44 | 458 | $6 \times 10^{-12}$ |
| 243 Am | 5.28 5.23 | $7.95 \times 10^3$ | $6 \times 10^{-12}$ |
| 242 Cm | 6.12 6.07 | 0.445 | $1 \times 10^{-10}$ |
| 243 Cm | 6.06 5.99 5.79 5.74 | 32 | $6 \times 10^{-12}$ |
| 244 Cm | 5.81 5.77 | 17.6 | $9 \times 10^{-12}$ |

*For a 40-hour week for the soluble form from NBS Handbook 69.

Because these concentrations are so small, it is important to be sure that there is a minimum amount of interference with measurements by radioactive dust which is defined as airborne particulate matter other than uranium and the transuranics that emits alpha particles in energy ranges of the order of those of uranium or the transuranics. If such radioactive dust is trapped on a filter in the course of accumulating plutonium or uranium for a measurement, the radiation from the radioactive dust distorts the measurement. It is possible to effect a certain level of discrimination by the use of multichannel analyzers which permit one to obtain a relatively broad spectrum of radiation and to gather therefrom information that permits some measure of correction for background. This is undesirable, however, as a continuing monitor in a nuclear power plant, a fuel reprocessing facility, a fuel fabricating facility, a laboratory for radiation research, or any other installation in which it is desirable to maintain a continuing watch for low levels of uranium and the transuranics in the air and to maintain a record of the amounts observed. It is difficult to justify the cost of a multichannel analyzer for effecting such discrimination if there is a better way to minimize the interfering counts from radioactive dust. Furthermore, even the use of a multichannel analyzer may not be adequate because of the spreading of the energy spectrum due to differing energy losses in the air space between a filter and a detector, and because the allowable maximum permissible concentrations are so low compared to typical background levels.

It is an object of the present invention to provide a better way of monitoring low concentrations of particulate uranium or transuranic isotopes in the air.

It is a further object of the present invention to provide a better apparatus for minimizing physically the presence of interfering background radiation in a stream of air containing small particles of uranium or transuranic elements.

Other objects will become apparent in the course of a detailed description of the invention.

SUMMARY OF THE INVENTION

Air that may contain uranium or transuranic elements in particle sizes ranging down to the order of 1/2 micron in diameter is formed into a stream. The particles in the stream of air are concentrated and detected by an apparatus including a first stage containing a plurality of virtual impactors for separating a portion of the radioactive dust from the stream of air while leaving essentially all of the denser uranium or transuranium particulate matter in the stream. A second stage containing a further plurality of virtual impactors separates still more of the radioactive dust which is removed from the apparatus. The stream of air containing uranium or transuranic particulate matter is thus reduced in total volume while retaining essentially all of the uranium or transuranic particulate matter. The air stream thus concentrated is passed through a paper filter that is disposed in measuring proximity to a detector of alpha particles and the filtered stream is then exhausted from the apparatus. A count of radiation from the detector provides a measure of the concentration of the desired isotopes with a minimum amount of interference from radioactive dust.

DETAILED DESCRIPTION OF THE INVENTION

Figure 1:
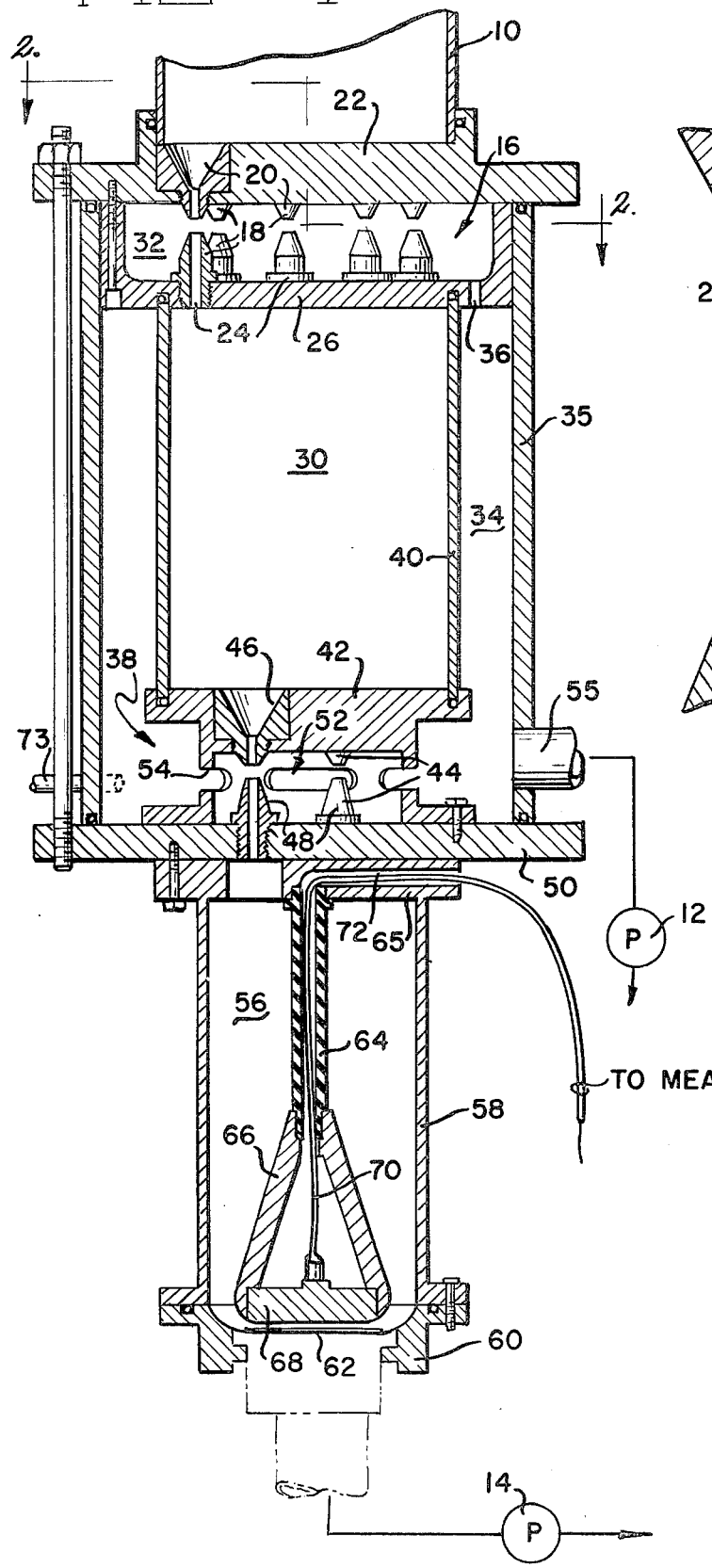
FIG. 1 is a sectional view of an apparatus for the practice of the present invention taken along the major axis of the apparatus.
Figure 2:
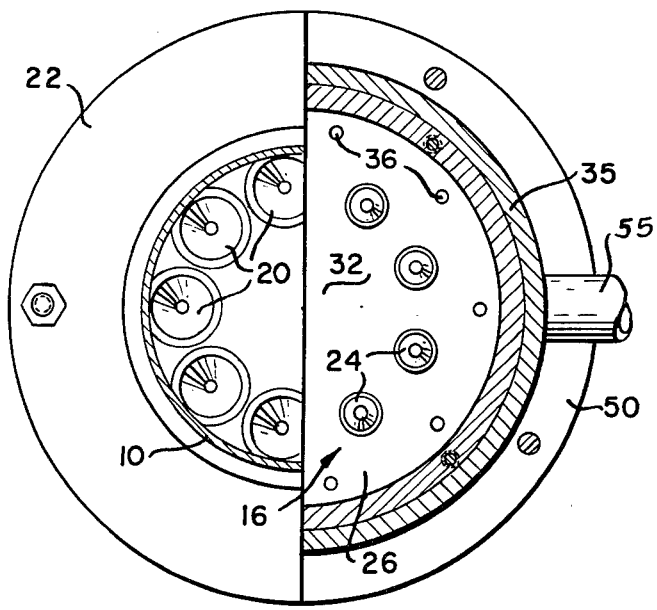
FIG. 2 is a split sectional end view of the apparatus of FIG. 1 taken along section lines 2—2.

FIG. 1 is a sectional side view of an apparatus for the practice of the present invention and FIG. 2 is a partial split sectional end view of the apparatus of FIG. 1 taken along section lines 2—2. In FIGS. 1 and 2, a stream of air containing particulate materials enters through tube 10 and flows through the apparatus under the influence of a slight negative pressure generated by vacuum pumps 12 and 14. The stream encounters a first stage 16 containing nine virtual impactors 18. Each virtual impactor 18 comprises an upper nozzle 20 mounted in a plate 22 and a lower nozzle 24 supported in an enclosure 26 so that each upper nozzle 20 has below it a coaxial lower nozzle 24.

Figure 3:
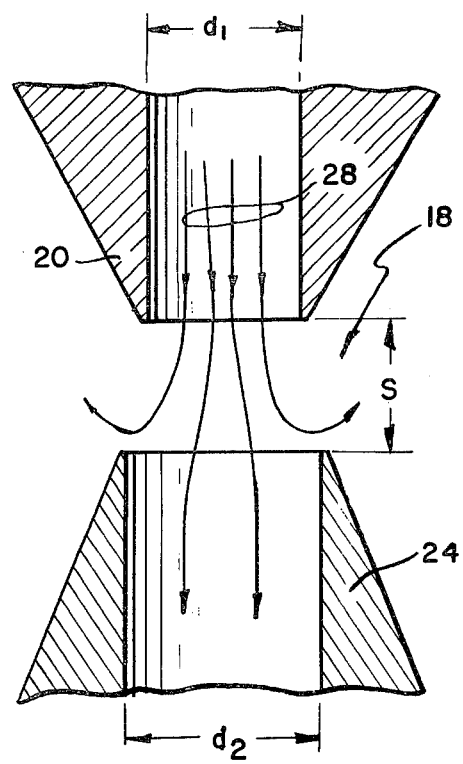
FIG. 3 is a sectional side view of a virtual impactor.

FIG. 3 is an expanded cross-sectional view of the operating portion of a single virtual impactor 18. The upper nozzle 20 is seen to be spaced a distance S from the lower nozzle 24. Upper nozzle 20 has diameter $d_1$ and lower nozzle 24 has diameter $d_2$. Stream lines 28 indicate the direction of flow and the means of particle separation. Those stream lines 28 nearer the interior surface of upper nozzle 20 are seen to bend sharply and to be deflected to miss entering lower nozzle 24. Heavier particles will be separated inertially from the outer stream lines 28 and will continue into nozzle 24, whereas lighter particles that are capable of following the stream lines or that are deflected less when the stream line turns will not enter lower nozzle 24.

Returning to FIGS. 1 and 2, that part of the original air stream that passes through a lower nozzle 24 will enter region 30 containing a higher concentration of heavy particulate matter than that of the original air stream. The part of the flow that does not enter a lower nozzle 24 enters region 32 formed by plate 22 and enclosure 26 and is conducted to region 34 by a plurality of holes 36 in enclosure 26. Region 34 is bounded on the outside by tube 35. The portion of the air stream that has entered region 30 is then subjected to a second stage 38 of concentration. A tube 40 spaces a plate 42 from the first stage 16 and serves to locate a plurality of virtual impactors 44 that comprise the separators for the second stage 38. Each virtual impactor 44 comprises an upper nozzle 46 that is disposed opposite a lower nozzle 48 in the same way that was illustrated for the virtual impactors of the first stage 16 in FIG. 3. Each lower nozzle 48 is supported in position in a plate 50 which, together with plate 42, defined a region 52. Those portions of the air stream that do not enter a lower nozzle 48 go to region 52 and then exit by a slot 54 to region 34 from which the air stream is evacuated through vacuum line 55 by vacuum pump 12. The portion of the air stream that passes through a lower nozzle 48 has thus been subjected to two stages of concentration through virtual impactors. The stream thus concentrated enters regions 56 which is defined by plate 50, tubular structure 58, filter holder 60 and filter paper 62. A tubular support 64 made of an electrically insulating material is mounted on the flange portion 65 of tubular structure 58 to support a conical fitting 66 which supports an alpha particle detector 68. Coaxial cable 70 is conducted through conical fitting 66, tubular support 64 and through hole 72 in flange portion 65 to conduct signals detected by detector 68 to a measuring device. Filter paper 62 is selected to trap particles down to a minimum desired size and maintain these particles in measuring proximity to detector 68. FIG. 1 also shows various screws, support rods and O-rings that maintain a unified structure while isolating regions 30, 32, 34 and 56 from one another and from the outside of the apparatus of FIG. 1. A vacuum line 73 can either be plugged to render it inoperative or can be connected to a manometer or the like to measure vacuum in region 34.

Figure 4:
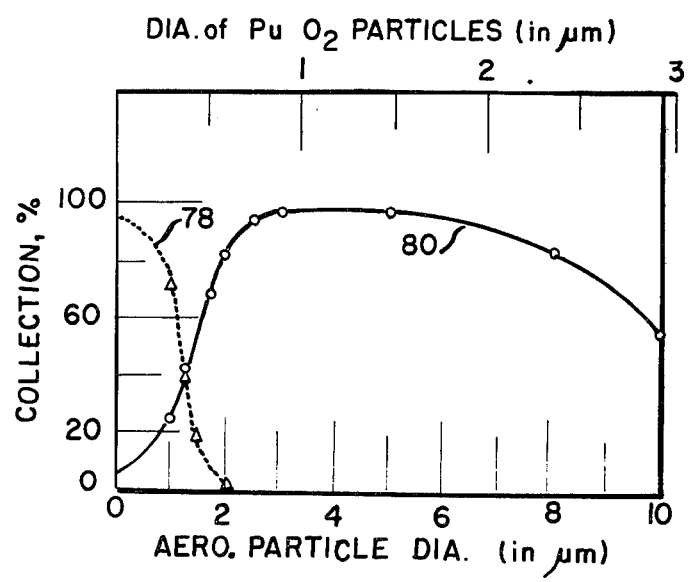
FIG. 4 is a measured plot of percent transmission through the apparatus of FIG. 1 as a function of aerodynamic particle size.

The results of a measurement on a particular embodiment of the apparatus of FIGS. 1 and 2 are shown in FIG. 4 which is a plot of the collection percentage as a function of the aerodynamic particle size for such an apparatus. The aerodynamic particle size is defined as the diameter of a particle that is spherical in shape and has a specific gracity of unity. This is related to particles of specific gravities differing from unity by the reciprocal of the square root of the density ratio. This is made graphic by the abscissa plotted at the top of FIG. 4 which is the equivalent actual diameter of spherical particles of plutonium oxide (specific gravity 11.5) placed to correspond with the scale of aerodynamic particle sizes. The curves of FIG. 4 were obtained by forming a liquid aerosol with droplets of a precisely known diameter dispersed in air. The data thus obtained can be extrapolated with confidence through the aerodynamic diameter as described above. In FIG. 4, curve 78 is a plot of the collection at the outlet as a function of particle size. Referring to FIG. 1, this is to say that curve 78 includes those particles that were drawn into and through vacuum pump 12. Curve 80 is the plot of collection as a function of aerodynamic particle size for those particles that were collected on filter paper 62. Most of the particles that have been described earlier as radioactive dust, those radioactive particles that provide unwanted background reading, have been observed to have aerodynamic diameters under 2 micrometers. It is evident by inspection of FIG. 4 that such particles are substantially all separated from the stream that proceeds to the filter paper and are conducted to the outlet where they avoid measurement and hence avoid generating misleading interference at the recorder. The particle size reaching the filter paper, on the other hand, is substantially level down to an aerodynamic diameter slightly above 2. This corresponds for plutonium dioxide to a diameter of the order of 0.6 micrometers. It is well known that almost all of the activity associated with radioactive dust occurs in particles with aerodynamic diameters below 1 micrometer. The result is therefore to collect virtually all the small particulate plutonium dioxide on a filter for accumulation and measurement while removing nearly all of the radioactive dust from the measuring stream. Because of this reduction in background interference, it will generally be possible to use a single-channel analyzer to respond to the output of alpha particle detector 68 of FIG. 1. In contrast, where the radioactive dust is allowed to collect on the filter, it is necessary to obtain the spectrum of radiation of the particles collected on the filter and to perform some form of spectral analysis to sort background radiation from the desired radiation. This is general requires a multichannel analyzer which is considerably more expensive than a single-channel analyzer and takes more effort on the part of an operator.

The apparatus used to obtain the curves of FIG. 4 was designed specifically to detect particles of plutonium oxide ($PuO_2$) at a flow rate of 10 cfm (approximately 280 liters per minute). For this purpose first stage 16 of FIG. 1 comprised nine virtual impactors and second stage 38 comprised three. Dimensions of the virtual impactors are as listed in Table II.

TABLE II

DIMENSIONS OF VIRTUAL IMPACTORS

|  | First stage | Second stage |
|---|---|---|
| $d_1$ | 3.0 mm | 2.8 mm |
| $d_2$ | 1.3 mm | 1.3 mm |
| S | 3.0 mm | 2.8 mm |

These dimensions were calculated to produce separation of particles having aerodynamic diameters in the general range of 1–2 micrometers. If it were desired to shift the sorting scale, it would be possible to lower the minimum detected aerodynamic diameter somewhat by increasing the flow rates of pumps 12 and 14. Alternatively, the nozzles could be redesigned. The aerodynamic diameter at which separation is observed is a useful one, however, for oxides of uranium and of all the radioactive elements listed in Table I. The apparatus that was built was designed by selecting the desired flow rate of 10 cfm (approximately 280 liters per minute) and a first-stage virtual impactor as described in Table II. It was desired to pass approximately 0.7 cfm (20 liters per minute) through filter paper 62, and the maintain laminar flow through the virtual impactors. This led to a choice of nine virtual impactors in the first stage. Nine holes 36 were thus chosen and spaced to assist in maintaining laminar flow, and the holes 36 were sized to cause approximately 27.5% of the flow to pass through the virtual impactors of the first stage. The virtual impactors of the second stage were selected to have the same cutoff concentration as those of the first stage, and the choice of 0.7 cfm (20 l/m) as a final flow rate led to the choice of three virtual impactors in the second stage. Pump 12 was a centrifugal blower throttled to produce the desired inflow rate of 10 cfm. This was associated with a manometer reading at vacuum line 73 of a vacuum corresponding to about 12 inches (30 cm) of water, so that the desired condition of flow can be monitored easily by connecting a manometer to vacuum line 73. Pump 14 was a piston pump that was operated to produce a controlled flow of 0.7 cfm (20 l/m) through the filter paper. The alpha channel chosen overlapped the energies of 5.11 MeV and 5.16 MeV associated with $^{239}$Pu. These design parameters have been described in some detail to show that one skilled in the art could adapt the apparatus readily to detect other radioactive particles of uranium or transuranic isotopes in the air.

Referring again to FIG. 4, the drop in the value of the collected percentage as the aerodynamic diameter approaches 10 micrometers is believed to be an artifact of the measuring method. As stated earlier, a liquid aerosol was used to obtain the points of FIG. 4. The larger drop sizes tend to coalesce as liquid on the interior walls of the apparatus. This will not happen with solid particles, so the equivalent curve to FIG. 4 for solid particles in air is expected to stay flat at the upper value for any particles small enough to stay in suspension.

The embodiments of the invention in which an exclusive property or privilege is claimed are defined as follows:

1. An apparatus for monitoring the concentration of particles of dense radioactive material in air, the apparatus comprising:

means for generating a stream of air containing particles of dense radioactive materials;

a first separating stage including a first plurality of virtual impactors receiving and separating the stream into a more concentrated stream of larger particles and a first stream of smaller particles;

means for exhausting the first stream of smaller particles;

a second separating stage including a second plurality of virtual impactors receiving and separating the more concentrated stream of larger particles into a twice concentrated stream of larger particles and a second stream of smaller particles;

means for exhausting the second stream of smaller particles;

filter means coupled to the twice concentrated stream of larger particles to trap particles from the twice concentrated stream of larger particles; and means for measuring radioactivity of particles trapped by the filter means.

2. The apparatus of claim 1 wherein each of the virtual impactors of the first plurality comprises in combination a first nozzle receiving in a cylindrical aperture a portion of the stream of air containing particles of dense radioactive materials and a second nozzle containing a cylindrical aperture coaxial with the cylindrical aperture and separated from the first nozzle by a predetermined distance.

3. The apparatus of claim 1 wherein the means for exhausting the first and second streams of smaller particles comprises a centrifugal pump connected operatively to apply a reduced pressure to the first and second streams of smaller particles.

4. The apparatus of claim 1 wherein the filter means comprise a filter paper disposed in the twice concentrated stream and a filter holder to maintain the filter paper in the twice concentrated stream such that the twice concentrated stream passes through the filter paper.

* * * * *